Figure 1:
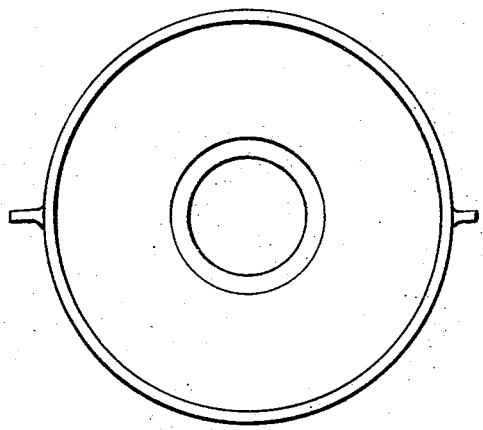
Figure 4:
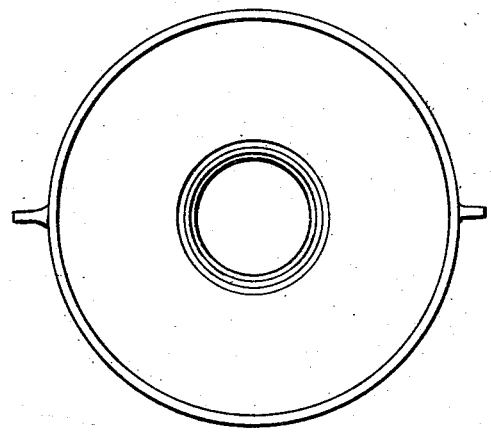
Figure 2:
Figure 5:
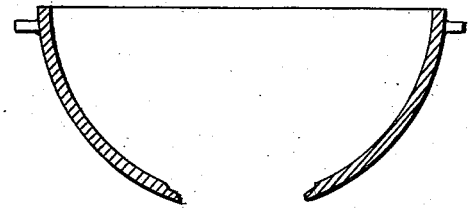
Figure 3:
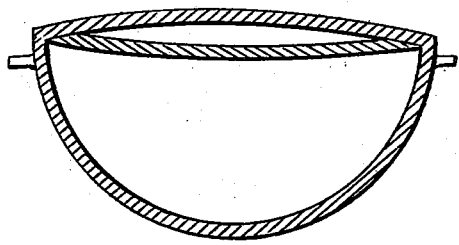
Figure 6:
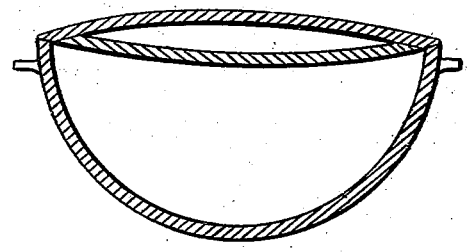

GRIFFIN & AVERY.

Salt Boiler.

No. 3,007. Patented March 21, 1843.

UNITED STATES PATENT OFFICE.

R. GRIFFIN AND L. Y. AVERY, OF SALINA, NEW YORK.

IMPROVEMENT IN SALT-BOILERS.

Specification forming part of Letters Patent No. 3,007, dated March 21, 1843.

*To all whom it may concern:*

Be it known that we, RHESA GRIFFIN and LATHAM Y. AVERY, of the town of Salina, in the county of Onondaga and State of New York, have jointly invented a new and useful Improvement called Salt-Kettles with Movable Bottoms; and we do hereby declare that the following is a full and exact description.

The nature of our invention consists in casting the kettle and bottom separate.

To enable others skilled in the art to make and use our invention, we will proceed to describe its construction and operation.

The kettle is made of cast-iron in the form of a half-globe as near as may be, and varies in capacity from thirty to one hundred and fifty gallons, and is cast bottomless, leaving the opening in the bottom circular and varying with the size of the kettle from six to twenty-four inches in diameter, the opening being smallest on the outside of the kettle, and widening uniformly until it reaches the inside of the kettle, thus making the opening according to the size of the kettle from one to four inches larger on the inside of the kettle than on the outside, or by permitting the opening to widen from the outside two-thirds through the thickness of the kettle and then have a level offset or table of one inch in width, and from thence widen again to the inside of the casting and making the difference in the diameter of the opening between the inside and outside from one to four inches, as above mentioned. Then a casting is made corresponding with the circle of the kettle inside and out, and so shaped as to fit exactly the opening in the bottom of the kettle. Around the opening on the outside of the kettle a projection is left, so as to strengthen the kettle at the opening, and the kettle is made water-tight by cementing the joint or seam with a paste or cement made from quicklime mixed with water.

Figure No. 1 of the drawings accompanying this specification represents an inside view of the kettle with the opening left as in the first plan of the shape of the opening. Fig. No. 2 gives a side view of the kettle under the same plan with the bottom out. Fig. No. 3 represents an outside view with the movable bottom in. Fig. No. 4 represents an inside view of the kettle and opening left as in the second plan of the shape of the opening. Fig. No. 5 gives a side view of the kettle under the same plan with the bottom out. Fig. No. 6 represents an outside view with the movable bottom in.

The advantages of this improvement are:

First. From three to five hundred kettles are annually wanted to supply the wastage or wearing out in the manufacture of salt in this town. The brine as it comes from the salt-springs, when boiling in the kettles, precipitates impurities, which, collecting at the bottom, form a heavy incrustation or coating, thereby, after a few days' use, preventing the water in the bottom of the kettles from touching or coming in contact with the iron, the consequence of which is that the bottom of the kettle, being thus exposed to the heat without protection from the water inside of the kettle, gets red-hot and either burns out or cracks up. This in a kettle cast whole either entirely destroys the whole kettle or subjects the owner to a heavy expense in repairs, whereas by this improvement the bottom only is lost, a new one being readily fitted to the opening left in the kettle, or if the movable bottom is merely cracked or broke it is easily mended, being much better to handle than a whole kettle.

Secondly. The salt-manufactories are made by setting from thirty to sixty kettles in a double row or arch permanently embedded in brick and stone masonry, by reason of which, if a kettle cast whole fails in the bottom, it is necessary to cool down the whole works for a long time, and take out of its bed of masonry the broken kettle and carry it to the mechanic to be repaired, or place a new one in its stead, and repair the mason-work around at a great loss to the manufacturer both of time, labor, and money, whereas with this improvement, in case that one of the movable bottoms fail, the fire has to be slacked, but little and hardly any time is lost in removing the destroyed bottom and placing a new one in its place without disturbing the masonry of the arch, and scarcely at all delaying the operations of the manufactory.

Thirdly. The expense of a kettle of the proper size to place over the hottest part of the fire in a salt-manufactory is from twenty to thirty dollars, which expense with kettles cast whole is almost annually recurring. The movable bottoms for the open-bottom kettles will cost about four dollars, and as the kettle invariably commences failing in the bottom this new kind of kettles, so far as the bottom is concerned, will last many years, and the movable bottoms will last or endure longer than the bottoms of kettles cast whole, inasmuch as the bottom being disconnected with the sides expands and contracts uniformly without reference to the sides, whereas in a kettle cast whole the bottom and sides receiving different degrees of heat do not expand and contract together; consequently the bottom settles, burns, and falls out or breaks, and the cracks running up the sides of the kettles render the whole unfit for further use.

What we claim as our invention, and desire to secure by Letters Patent, is—

The casting the salt-kettles with a movable bottom, which bottom can be replaced when destroyed by fire, as hereinbefore described.

RHESA GRIFFIN.
LATHAM Y. AVERY.

Witnesses:
CORNELIUS L. ALVORD,
LOYAL C. KELLOGG.